US008654321B2

(12) United States Patent
Ott (10) Patent No.: US 8,654,321 B2
(45) Date of Patent: Feb. 18, 2014

(54) TESTING OF OPTICAL CABLE USING OPTICAL TIME DOMAIN REFLECTOMETRY

(75) Inventor: Michael James Ott, Chaska, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/291,779

(22) Filed: Nov. 8, 2011

(65) Prior Publication Data

US 2012/0176607 A1    Jul. 12, 2012

Related U.S. Application Data (60) Provisional application No. 61/411,771, filed on Nov. 9, 2010.

(51) Int. Cl.
*G01N 21/00* (2006.01)
(52) U.S. Cl.
USPC .......................................... 356/73.1
(58) Field of Classification Search
USPC .......................................... 356/73.1
See application file for complete search history.

(56) References Cited

U.S. PATENT DOCUMENTS

| 5,179,420 A | 1/1993 | So et al. |
| 5,530,546 A | 6/1996 | Barringer et al. |
| 2003/0021554 A1* | 1/2003 | Suzuki ............................ 385/96 |
| 2004/0190852 A1* | 9/2004 | Oyamada ...................... 385/147 |
| 2009/0129773 A1* | 5/2009 | Oron .............................. 398/10 |

FOREIGN PATENT DOCUMENTS

| EP | 1 392 011 A2 | 2/2004 |
| EP | 1 586 884 A2 | 10/2005 |

OTHER PUBLICATIONS

International Search Report and Written Opinion mailed Feb. 3, 2012.
So, V. et al., "Automation of an Optical Time Domain Reflectometer to Measure Loss and Return Loss," *Journal of Lightwave Technology*, vol. 8, No. 7, pp. 1078-1083 (Jul. 1990).

* cited by examiner

*Primary Examiner* — Tu Nguyen
(74) *Attorney, Agent, or Firm* — Merchant & Gould P.C.

(57) ABSTRACT

Methods for testing optical equipment are disclosed. One method includes connecting an optical time domain reflectometer to optical equipment to be tested, the optical equipment including at least one optical connector. The method includes injecting an optical signal onto the optical equipment from the optical time domain reflectometer, and observing an amount of reflected light at the connector. Based on the observed reflected light, an amount of loss attributable to the optical equipment is determined.

22 Claims, 10 Drawing Sheets

TESTING OF OPTICAL CABLE USING OPTICAL TIME DOMAIN REFLECTOMETRY

CROSS-REFERENCE TO RELATED APPLICATIONS

The present application claims priority from U.S. Provisional Patent Application No. 61/411,771, filed on Nov. 9, 2010, the disclosure of which is hereby incorporated by reference in its entirety.

TECHNICAL FIELD

The present disclosure relates generally to testing of optical fiber connections. In particular, the present disclosure relates to testing of optical cable using optical time domain reflectometry.

BACKGROUND

Optical components are tested after they are manufactured to determine whether connectors at ends of the components can make a reliable optical connection. A reliable optical connection typically means a connection that has associated with it less than a threshold amount of loss of optical power (e.g., less than a 0.2 dB loss).

Figure 1:
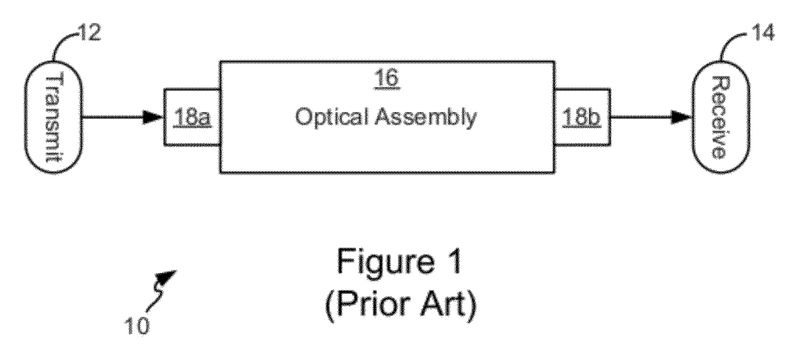
FIG. 1 illustrates a schematic of a prior art optical test assembly.

Currently, optical testing is performed on an overall throughput loss basis. An example test setup 10 is illustrated in FIG. 1, and includes a transmitter 12 that transmits a signal having a known power and a receiver 14 that can detect power transmitted on opposite sides of an optical device 16 under test. The optical assembly 16 to be tested is interconnected between the transmitter 12 and the receiver 14, at connectorized ends 18a, 18b. The difference in optical signal strength at each end of the optical device 16 corresponds to the difference between transmitted power and received power.

In one example of such a test, optical equipment 16 (e.g., including some type of connectorized fiber, such as a splitter or other optical equipment) is tested by injecting a signal having a known power from the transmitter 12 to the receiver 14. The loss in power due to the tested system (e.g., the splitter) is referred to as insertion loss of the optical device. This loss primarily occurs at the leading edge connector (e.g., connector 18a), because the receiver includes a photodetector rather than a second fiber-to-fiber junction. The amount of power reflected back to the transmitter (at which a receiver can also optionally be placed) is referred to as return loss. To obtain both the insertion loss and return loss in an arrangement such as that shown in FIG. 1, the transmitter 12 and receiver 14 are placed at opposing sides of the optical device 16, and losses are measured; then, the positions of the transmitter 12 and receiver 14 are reversed, and the optical device is retested.

Use of this type of test setup does not work well with optical devices that are not connectorized at both ends. This is because the test arrangement typically involves connecting transmitting and receiving equipment to both an input and output side of the optical assembly. So, for devices that are not sold preconnectorized at both ends, temporary connectors must be installed onto the otherwise non-connectorized end. These temporary connectors, and the permanent connectors otherwise included in such optical devices, are error prone and are tested on a trial and error basis until a successful reading is achieved. Additionally, the location of an error within a particular optical device cannot be detected using such an end-to-end arrangement; only overall loss can be detected.

Therefore, in existing systems there are a large number of possible sources of error in forming a functional optical device with acceptable insertion loss and return loss, and testing is very time consuming due to the requirement of inserting temporary connectors and testing each device multiple times.

SUMMARY

In accordance with the following disclosure, the above and other issues are addressed by the following:

In a first aspect, a method of testing optical equipment is disclosed. The method includes connecting an optical time domain reflectometer to optical equipment to be tested, the optical equipment including at least one optical connector. The method also includes injecting an optical signal onto the optical equipment from the optical time domain reflectometer, and observing an amount of reflected light at the connector. The method includes, based on the observed reflected light, determining an amount of loss attributable to the optical equipment.

In a second aspect, a method is disclosed for testing an optical connection of a fiber having first and second ends and a known mode field diameter, the fiber including an optical connector installed on one of the first and second ends. The method includes injecting an optical signal onto the optical fiber from a optical time domain reflectometer, and observing an amount of reflected light at the optical connector. The method includes determining an amount of loss at a junction formed between the optical time domain reflectometer and the optical connector, and adjusting the loss attributable to the optical equipment based on the known mode field diameter of the fiber. The method further includes comparing the loss attributable to the optical equipment, as adjusted based on the known mode field diameter, to a predetermined amount of loss, and, if the adjusted loss attributable to the optical equipment exceeds the predetermined amount of loss, determining that the optical connection formed at the optical connector is faulty.

In a third aspect, a method of testing connections for a plurality of optical devices is disclosed. The method includes, for each optical device, injecting an optical signal onto each connectorized optical fiber from a optical time domain reflectometer. The method also includes, for each injected optical signal, observing an amount of reflected light at an optical connector of the connectorized optical fiber, and determining an amount of loss at a junction formed between the optical time domain reflectometer and the optical connector. The method also includes, for each injected optical signal, comparing the loss attributable to the optical equipment to a predetermined amount of loss. If the adjusted loss attributable to the optical equipment exceeds the predetermined amount of loss, the method includes identifying the optical connector as potentially faulty.

In a fourth aspect, an optical testing system includes an optical connector installed at an end of an optical cable, and an optical time domain reflectometer connected to the optical connector, the optical time domain reflectometer configured to inject an optical signal onto the optical cable and observe an amount of reflected light at the connector. The testing system also includes a computing system communicatively connected to the optical time domain reflectometer, the computing system configured to determine an amount of loss attributable to the optical connector based on the amount of light reflected at the optical connector.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to methods and systems for testing of optical equipment, including the testing of optical connectors included in that equipment to determine if they are faulty. The present disclosure relates to testing methods and test assemblies that can determine whether optical connectors are faulty without requiring each optical assembly to be tested in a bidirectional manner (e.g., detecting a difference in optical power injected onto each side of optical equipment), and therefore does not require optical equipment to be connectorized at opposing ends.

In the context of the present disclosure, optical equipment can include, for example, any optical cable assembly including at least one connectorized end. The optical equipment can be, for example a single fiber having one connectorized end and one unconnectorized or unterminated end (e.g., a fiber stub) of various lengths, for example from a few centimeters long up to and including a coil of kilometers in fiber length. The optical equipment can also be complex optical routing equipment including any of a number of optical splitters, connectors, and optical paths. An optical connector could be determined to be faulty if it fails to pass through it at least a predetermined amount of an optical signal received at the connector. In certain embodiments of the present disclosure, an optical connector is determined to be faulty if an optical signal passes through the connector exhibits a greater than 0.2 dB loss in signal strength. However, the methods and systems for testing described herein are applicable regardless of the specific predetermined level of loss deemed acceptable for a connector in the optical device.

I. Test Assembly and Physical Considerations

Figure 2:
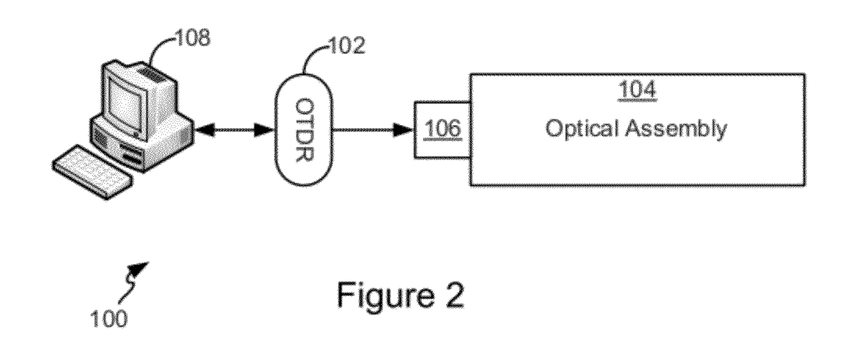
FIG. 2 illustrates a schematic of a test assembly useable according to certain embodiments of the present disclosure.

Referring now to FIG. 2, an example test assembly 100 is shown for testing optical equipment. The test assembly includes an optical time domain reflectometer (OTDR) 102 optically interconnected to an optical device 104 at an optical connector 106. In general, the OTDR 102 injects a light signal onto an optical fiber, and detects reflected light received at the source. An optical time-domain reflectometer, such as OTDR 102, is an optoelectronic instrument used to determine characteristics of an optical path. In operation, an OTDR injects a series of optical signals onto the optical fiber being tested (e.g., via a connector of an optical device). The OTDR also receives, at the same connection, light that is scattered or reflected back from various points along the fiber (typically, connectors or other discontinuities). The strength of the return pulses can be measured and integrated as a function of time, and plotted as a function of fiber length. Examples plotting such signal strength are provided in FIGS. 4-5, below. The OTDR 102 can be any of a number of types of OTDR systems commonly available, and which is capable of detecting losses of a magnitude at least as small as the predetermined level of loss deemed acceptable for an optical connector. Preferably, the OTDR 102 is capable of detecting losses smaller than that of the predetermined level of loss deemed acceptable for an optical connector, at least in part because the precision of the OTDR 102 can add further error to the estimations described below in connection with FIGS. 9-12 relating to estimated losses due to optical connectors.

The optical device 104 can be any of a number of optical devices, such as an optical splitter or other optical device, which includes one or more optical connectors 106. In the embodiment shown, the optical device includes only a single optical connector 106, but in alternative embodiments, additional optical connectors could be connected to additional optical fibers of the device 104. In particular, the testing methods of the present disclosure are advantageous in cases where one end of an optical path through an optical device is connectorized (and the other end is not); however, the methods described herein are equivalently useable in cases where both input and output fibers of an optical device are connectorized. In the context of the present disclosure, the optical device 104 can also be referred to as an optical assembly, and can include one or more optical paths defined in whole or part by optical fibers or optical paths extending therethrough.

The optical connector 106 can be any of a number of types of optical connectors typically used to interconnect optical paths, such as an FC-type, LC-type, SC-type, ST-type, CX.5-type, or other types of optical connectors. Typically, the optical connector 106 will include an arrangement which aligns an optical ferrule, and an optical fiber encircled by that optical ferrule, with a corresponding ferrule and fiber, such as is illustrated in connection with FIGS. 3-4.

In some embodiments, the OTDR 102 can be communicatively connected to a computing system 108, which can be used to receive readings from the OTDR and calculate an amount of signal loss attributable to the optical connector 106, or the optical assembly 104. The computing system 108 can take any of a variety of forms, and can include one or more programmable circuits capable of executing program modules. As such, some of the logical operations of the various embodiments of the disclosure, such as those disclosed below in connection with FIGS. 7-8, can be implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In accordance with the present disclosure, program modules may include routines, programs, components, data structures, and other types of structures that may perform particular tasks or that may implement particular abstract data types. Moreover, embodiments of the disclosure may be practiced with other computer system configurations, including handheld devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain or store the program for use by or in connection with the instruction execution system, apparatus, or device, but generally excludes propagated signals.

Figure 3:
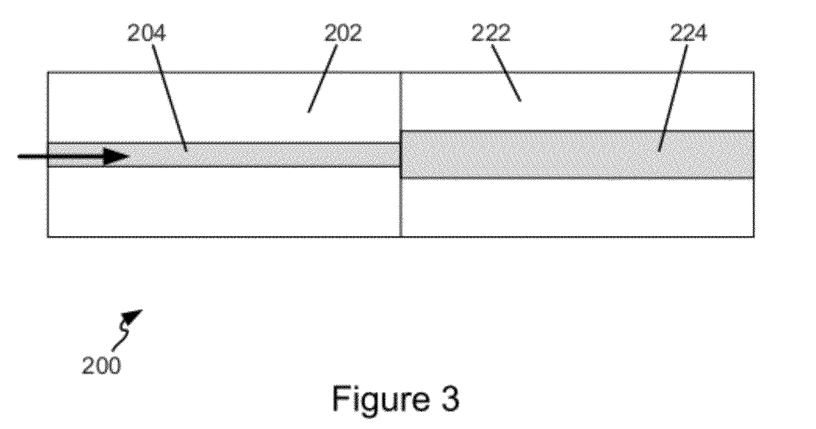
FIG. 3 illustrates a first example schematic optical junction between a tested component and a connector of an optical time domain reflectometer, according to a possible embodiment.
Figure 4:
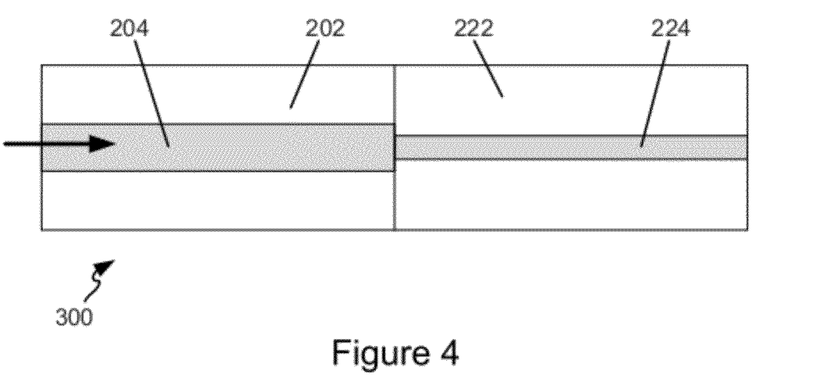
FIG. 4 illustrates a second example schematic optical junction between a tested component and a connector of an optical time domain reflectometer, according to a possible embodiment.
Figure 5:
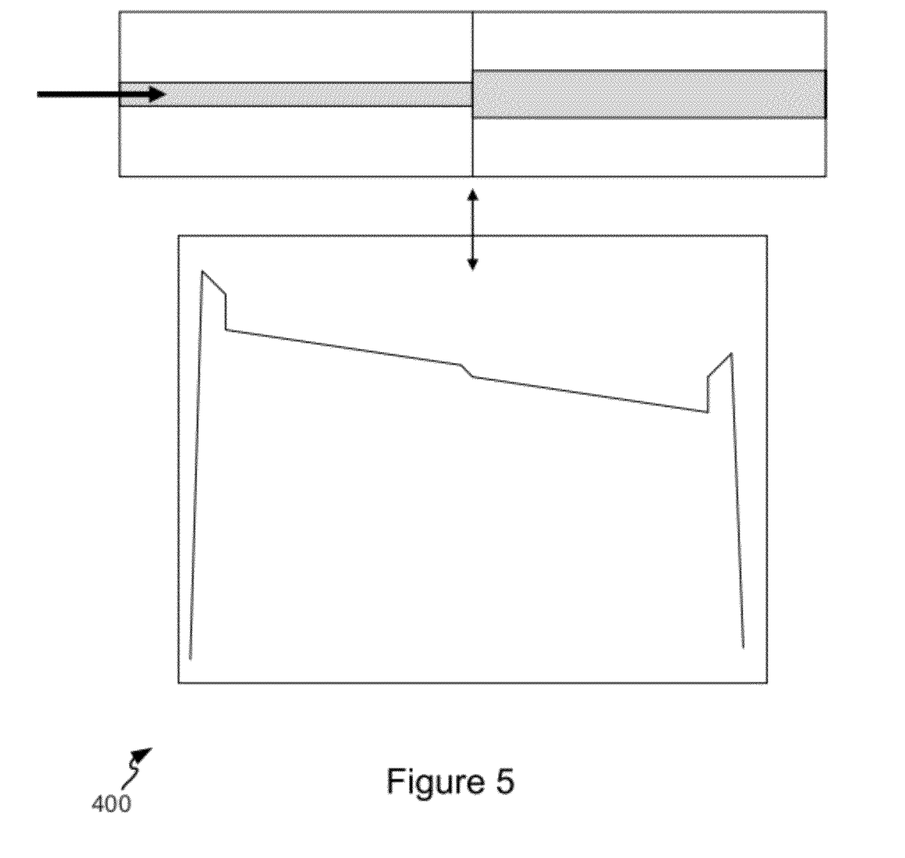
FIG. 5 illustrates an example optical signature received at an optical time domain reflectometer based on differing mode fields at an optical connection.
Figure 6:
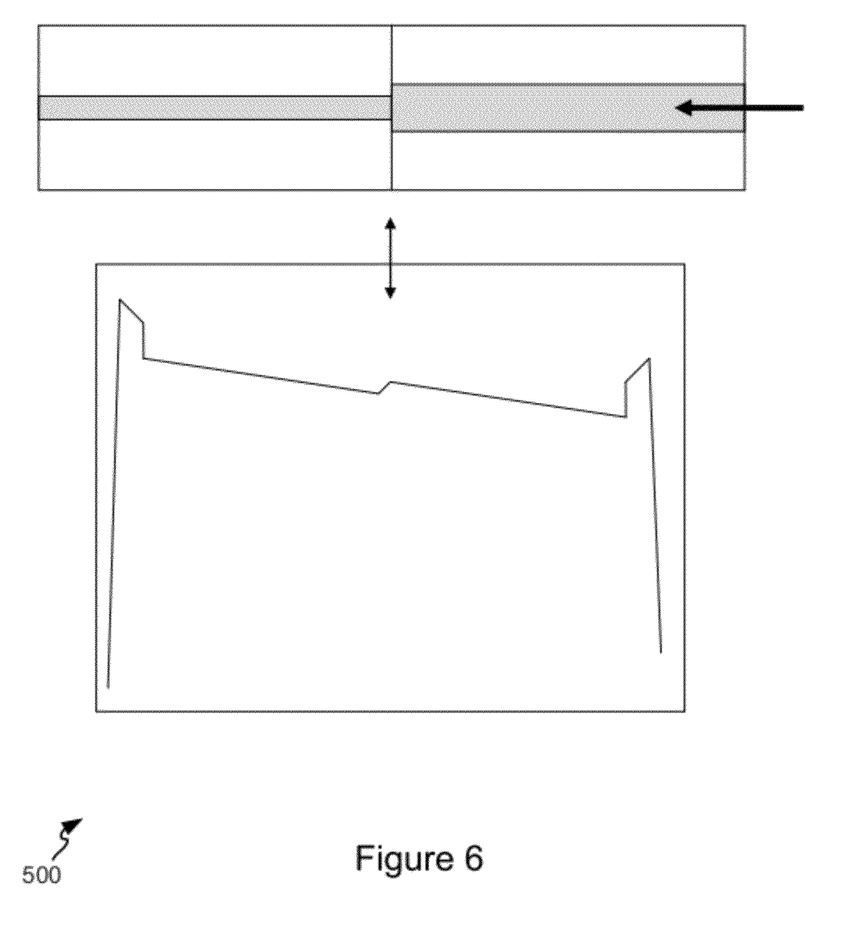
FIG. 6 illustrates a second example optical signature received at an optical time domain reflectometer based on differing mode fields at an optical connection.

FIGS. 3-4 illustrate example schematic optical junctions between two optical fibers, such as fibers of a tested component and a connector of an optical time domain reflectometer. The optical junctions disclosed in FIGS. 3-4 illustrate differing mode field diameters associated with an OTDR and an optical device which are joined at a connector interface. Mode field diameter refers to the diameter of the portion of the optical cable that carries the optical signal. For the most common single-mode fiber, nominal mode field is 9.1 um (@1310 nm); however, the mode field can vary by ±0.5 um, although fibers having mode fields far away from 9.1 um are rare. As discussed below in connection with FIGS. 5-6, compared to the transmitted signal, minor reflections are caused at the junction between two fibers with differences in mode fields, caused, for example, by differing concentrations of dopants in the two glass cores. These reflections can cause errors in readings of ±0.2 dB in the worst case, which is on par with the threshold amount of acceptable insertion loss. The relationship between mode field differences and reflection errors is linear, with greater differences between mode fields causing greater errors. Therefore, large differences in mode fields between two fibers, although rare, can skew or obscure results regarding acceptability of a connector interface.

In FIG. 3, an optical assembly 200 is shown in which a cladding of a fiber associated with the OTDR 202 is aligned to and abuts a cladding 222 associated with optical equipment. This can occur, for example, when a connectorized end of the optical equipment is connected to the OTDR. In the embodiment shown, the OTDR cladding 202 has an associated fiber core 204 extending therethrough, and having a mode field of a known diameter. The cladding 222 associated with optical equipment also has an associated fiber core 224 extending therethrough, and aligned (typically by the body of the connector, not shown) with the OTDR fiber core 204.

In the embodiment shown, although the cladding 202, 222 of each fiber is of equivalent size (typically approximately 125 microns, the fiber core 204, 224 of each fiber are not equally sized. Specifically, in this arrangement, fiber core 224 has a mode field diameter that is larger than the mode field diameter of the OTDR fiber core 204. Although the mode field diameter of each of these fibers may vary, in certain embodiments, the OTDR fiber 204 has a known mode field diameter of approximately 9.1 micrometers (um), and the mode field diameter of fiber core 224 is approximately the same, but potentially varies by ±0.5 um. In the embodiment shown, if the fiber core 204 has a mode field of approximately 9.1 um, the fiber core 224 would have a mode field of 9.1 to 9.6 um.

In contrast, in FIG. 4, an optical assembly 300 is illustrated in which OTDR cladding 202 and fiber core 204 are interfaced to a cladding 242 and associated core 244 of an adjacent fiber (e.g., joined at a connector to the OTDR). In this example, the fiber core 244 has a mode field that is smaller than that of the OTDR fiber core 204. Continuing the above example, if the fiber core 204 has a mode field of approximately 9.1 um, the fiber core 244 would have a mode field of 8.6 to 9.1 um.

In certain embodiments, and as discussed below, the mode field diameter of fibers interfaced to an OTDR system (e.g., fiber cores 224, 244) may or may not be known by a tester of the fiber and/or optical device to be tested using the OTDR; however, differences in mode field will cause differences in the amount of light backscattered to the OTDR. In certain embodiments, such as those discussed above, differences in backscattered light due to mode field diameter can change detected transmission loss levels by approximately −0.2 dB to +0.2 dB. Other loss levels may be possible as well, depending upon the expected mode field diameter variations among fibers.

In certain embodiments, the mode field diameter of the fiber cores included in an optical device may, in certain embodiments, be tracked and computationally accounted for when determining the acceptability of a connector. Due to the linear relationship between mode field and transmission loss, in association with the methodology disclosed herein, optical devices can be tested to determine the quality of a connector (e.g., connector 106 of FIG. 2), while optionally also accounting for mode field effects due to manufacturing variances between optical fibers found in optical devices.

Referring now to FIGS. 5-6, the effects of mode field diameter differences at a junction between two fibers is illustrated. Specifically, FIGS. 5-6 illustrate example optical signatures 400, 500 received at an optical time domain reflectometer based on differing mode fields at an optical connection, where a signal passes from a fiber having a smaller mode field diameter onto a fiber having a larger mode field diameter. The optical signatures 400, 500 represents optical signal levels received at an OTDR (e.g., OTDR 102) in response to transmission of an optical signal from that OTDR through an optical connection. Optical signature 400 represents optical signal levels occurring with relative mode field diameters such as the one illustrated in FIG. 3, where the OTDR fiber core has a mode field diameter smaller than that of the core of the connectorized fiber. Optical signature 500 represents optical signal levels occurring with relative mode field diameters such as the one illustrated in FIG. 4, where the mode field diameter of the fiber onto which a signal is injected (e.g., the OTDR fiber) is greater than that of the connectorized fiber on the other side of the optical junction.

As illustrated in optical signature 400, at the junction between two fiber cores (e.g., cores 204 and 224), a drop in optical power is illustrated. This drop is due to optical signals passing from a fiber core having a smaller mode field diameter to a fiber having a core with a larger mode field diameter. As such, the loss over the junction is exaggerated, as compared to a case where the mode field diameter is the same. As discussed above, this difference can make the detected transmission loss levels appear approximately 0.2 dB greater than otherwise observed. In contrast, as illustrated in optical signature 500, when an optical signal passes from a fiber having a larger mode field diameter to a smaller mode field diameter, the loss observed at the junction is less than would otherwise be observed, due to mode field effects. As discussed above, because these mode field effects are generally linear, it is possible to account for them without testing the optical device from each end; rather, models describing mode field differences can be developed and used. Using developed models, it is possible to account for mode field diameter effects without testing the fiber from opposing ends, and therefore only requires connectorization of one end of the optical equipment.

Additionally, as illustrated in both signatures 400, 500, fiber performance is consistent with respect to degradation of signal quality over distance. Therefore, when determining loss levels over a length of optical fiber (e.g., within an optical device), the rate of degradation of the signal level can be assumed, and least-squares calculations can be used to obtain averaged, accurate loss results using an OTDR device.

II. Testing Methods

Figure 7:
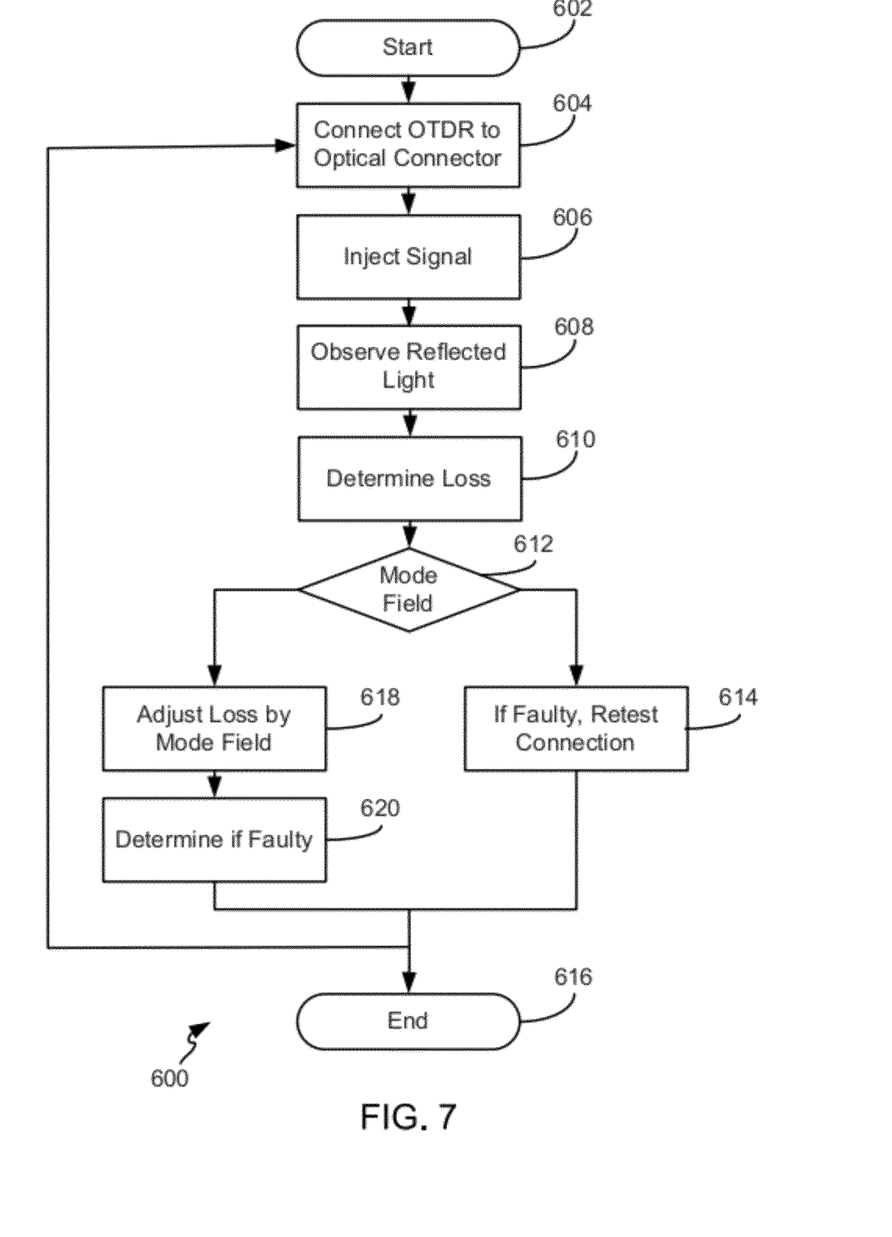
FIG. 7 is a flowchart of methods and systems for testing optical equipment, according to a possible embodiment of the present disclosure.
Figure 8:
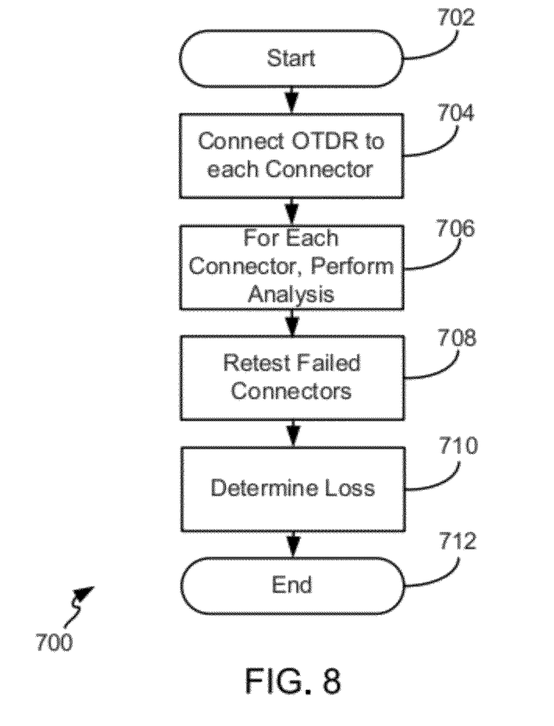
FIG. 8 is a flowchart of methods and systems for testing optical connections of a plurality of optical devices, according to a possible embodiment of the present disclosure.

Referring now to FIGS. 7-8, various methods for testing optical fiber and optical devices are disclosed, according to various embodiments of the present disclosure. FIG. 7 is a flowchart of methods and systems 600 for testing optical equipment, according to a possible embodiment of the present disclosure. The methods and systems 600 represent various operations performed by a user and/or devices operated by that user to test, observe, and determine the presence or absence of a faulty connector attached to an optical fiber, e.g., as part of an optical device. A start operation 602 initiates operation of the method, and can, for example, correspond to the beginning of a validation process performed on one or more optical devices.

When a user starts to test optical devices, the user will connect an OTDR to an optical connector of an optical device, at operation 604. The user will initialize the OTDR, allowing the OTDR to inject a signal onto the optical fiber connected to the OTDR, as shown at operation 606. The OTDR will inject one or more optical signals onto a fiber included in the optical device under test, and will observe light reflected back to the OTDR, plotting the backscattered light as a function of position (e.g., distance away from the OTDR device). Based on the observed light (e.g., reflected as a function of position, as illustrated in the optical signatures 400, 500 of FIGS. 5-6, above), an amount of loss can be determined at operation 610, both overall and at one or more fiber discontinuities. The loss at a particular connector of interest can be measured, and is understood to include a component attributable to the quality of the connection, as well as a component due to the effect of differing mode field diameters.

At this point, the loss that is observed has only been measured from one side of the optical device. As such, any difference in mode field will be included in the measured loss. Two approaches are possible to ensure that differences in observed loss due to mode field differences do not affect a determination of whether an optical connector is faulty, at operation 612. In a first option, a user does not track the mode field diameter of the optical fiber associated with the optical connector (and associated optical device). In this option, a user will determine, at operation 614, whether the optical connector exhibits an amount of loss that, if a worst-case scenario regarding mode field differences occurred, that loss would still be less than the predetermined threshold. If this is the case, the connector would be deemed "good" without further testing and without requiring connectorization of the opposite end of the optical device. Operation could proceed either to an end operation 616 signifying completed testing of the connector, or could return to operation 604, such that the OTDR could be connected to a next subsequent connector on the optical device under test, until each connectorized end has been tested.

In contrast, if the loss is within the range where, in a worst-case scenario, losses due to mode field effects might still result in the optical connector having unacceptable loss (e.g., a loss over a predetermined level), the connector could be retested using traditional means (i.e., bidirectional testing), or repolished and retested, either using an OTDR, or by connectorizing an opposing end (if not already connectorized) and testing the device on a throughput loss basis. The data suggests that most devices tested would be successfully screened using OTDR-based analysis and screening, leaving only a small percentage of devices that may require additional testing through the more laborious traditional power-through measurement, bidirectional techniques (e.g., as illustrated in FIG. 1) that require connectorization of opposing ends of an optical device. As explained further in connection with FIGS. 9-12, below, even if the mode field diameter of a particular optical device is unknown, it is possible to test the loss of an optical device using a single-direction test with an OTDR, and determine with high confidence that a connector meets a particular specification. For example, in the graphs described below in connection with FIGS. 9-12, connector loss can be determined to be less than 0.20 dB with greater than 95% probability, allowing a test operator to avoid having to connectorize and/or retest all but 5% of optical connectors using traditional methods.

In a second option, a user does track the mode field diameter of the optical fiber core associated with the optical connector (and associated optical device) being tested. In this option, a user will adjust, at operation 618, the observed loss based on the difference in mode field between the known mode field of the OTDR fiber core and the known mode field of the fiber core in the connector associated with the loss. Typically, mode field diameter is tracked for a particular fiber, and could be entered into a database for tracking and associating mode field values for the optical equipment. In certain embodiments, the loss attributable to mode field differences can be computed as a function of the individual OTDR signal reading. One example rule describing the linear relationship between mode field differences and insertion losses attributable to those differences is as follows:

Estimated Loss=Mode Field Difference×Multiplier+Constant dB

Figure 12:
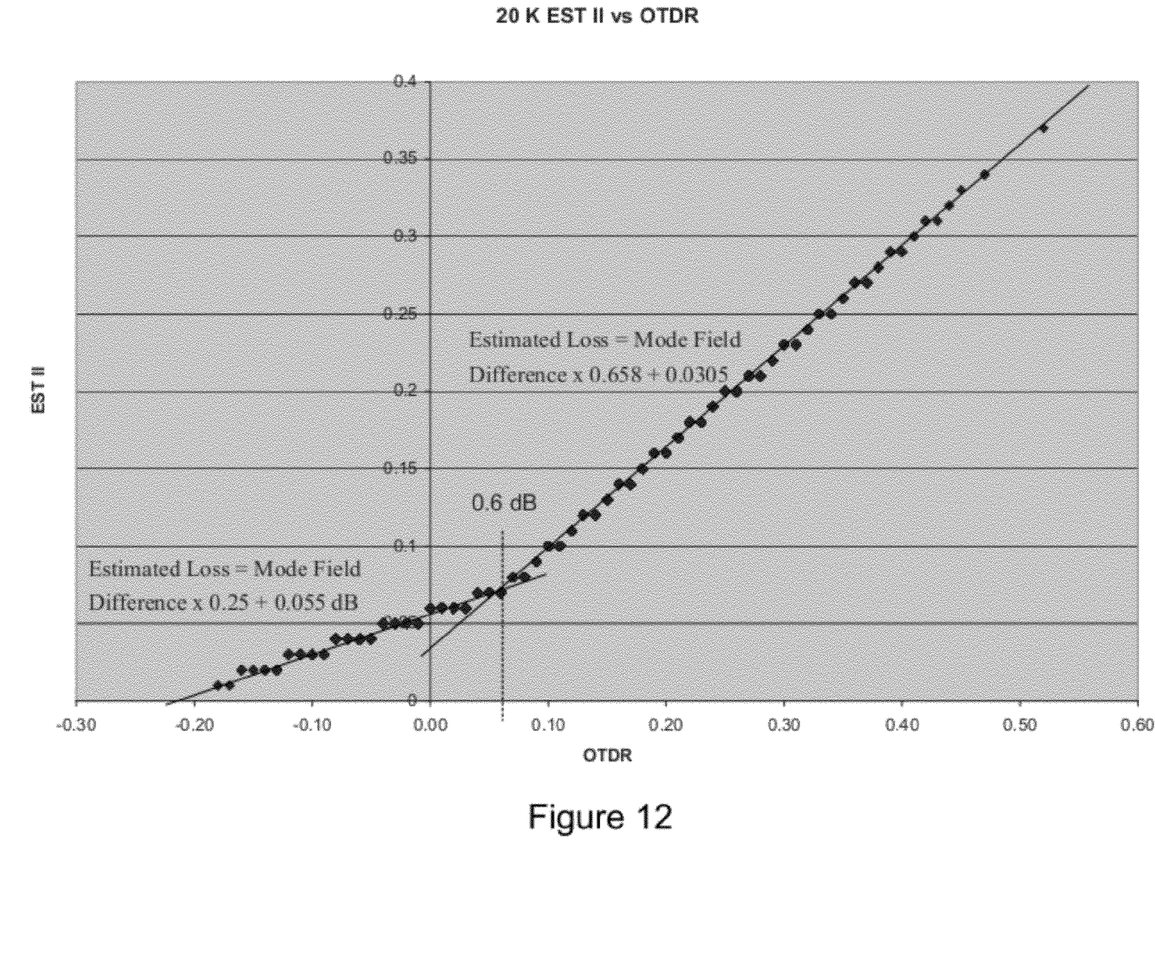
FIG. 12 is a plotted diagram illustrating accuracy of estimation of error based on a reading from an optical time domain reflectometer.

Furthermore, in certain embodiments, a multi-segment linear model illustrating the relationship between mode field diameter and loss can be derived, for example, from a large number of test results. In one such example, and as illustrated in FIG. 12, below, the following set of rules could be derived:

For OTDR readings up to and including 0.06 dB:

Estimated Loss=Mode Field Difference×0.25+0.055 dB

For OTDR readings greater than 0.06 dB:

Estimated Loss=Mode Field Difference×0.658+0.0305

Continuing this example, since OTDR test connector reference assemblies could be made to have fiber mode field diameters that are close to ideal (e.g., at about 9.1 um), minor adjustments can be made using the predictable linear relationships explained above. For example, if the mode field of a fiber used in a production optical assembly is 9.2 um, it would be known that a 0.04 dB loss would be attributable to, and exaggerated by, the mode field difference, and could be factored out of the determination of whether the connection is in fact good (e.g., observing a 0.24 dB loss on that connection would be acceptable, since 0.04 dB is attributable to mode field). Since each fiber used in an optical assembly has a known mode field, this would only involve tracking mode fields of each fiber of optical assemblies in computer systems.

After a particular loss is computed as adjusted from the observed loss, the computed loss is then compared, at operation 620, to a predetermined level of acceptable loss to determine whether the optical connector is faulty. If the computed loss is greater than the predetermined level, the connector can be discarded, repolished for retesting, or the entire device can be discarded. If the computed loss is not greater than the predetermined level, the connector is determined to be acceptable. Operation could proceed either to an end operation 616 signifying completed testing of the connector, or could return to operation 604, such that the OTDR could be connected to a next subsequent connector on the optical device under test.

FIG. 8 is a flowchart of methods and systems 700 for testing optical connections of a plurality of optical devices, according to a possible embodiment of the present disclosure. The methods and systems of FIG. 8 can, in certain embodiments, represent an overall testing strategy for testing a large number of optical components, such as at a manufacturer of such components for quality control or validation purposes.

A start operation 702 corresponds to initial testing of a group of optical components, such as optical splitters, connectorized optical fibers, or other devices. At operation 704, for each optical connector, a user will connect an OTDR. At operation 706, the user will perform a loss analysis to determine whether the optical connector has less than a predetermined level of signal loss. Operation 706 can, for example, correspond to performing the method 600 described above in connection with FIG. 7.

At operation 708, each of the optical connectors that failed testing using the OTDR analysis described above can be retested as necessary, either using unidirectional OTDR testing or standard bidirectional throughput testing, as necessary, to validate the readings based on OTDR analysis performed during operation 706. However, as explained above, it is expected that due to the greater than 95% accuracy of the OTDR testing, when a conservative approach is implemented toward mode field diameter effects, only about 5% of connectors require retesting as being suspected as faulty. Therefore, even if bidirectional testing is used for retesting, only a small portion of optical devices require connectorization of both ends and retesting. A loss determination operation 710 corresponds to validation of loss results based on OTDR analysis, and an end operation corresponds to completed validation of each of the optical devices under test.

III. Example Test Data and Model Extrapolation

Figure 9:
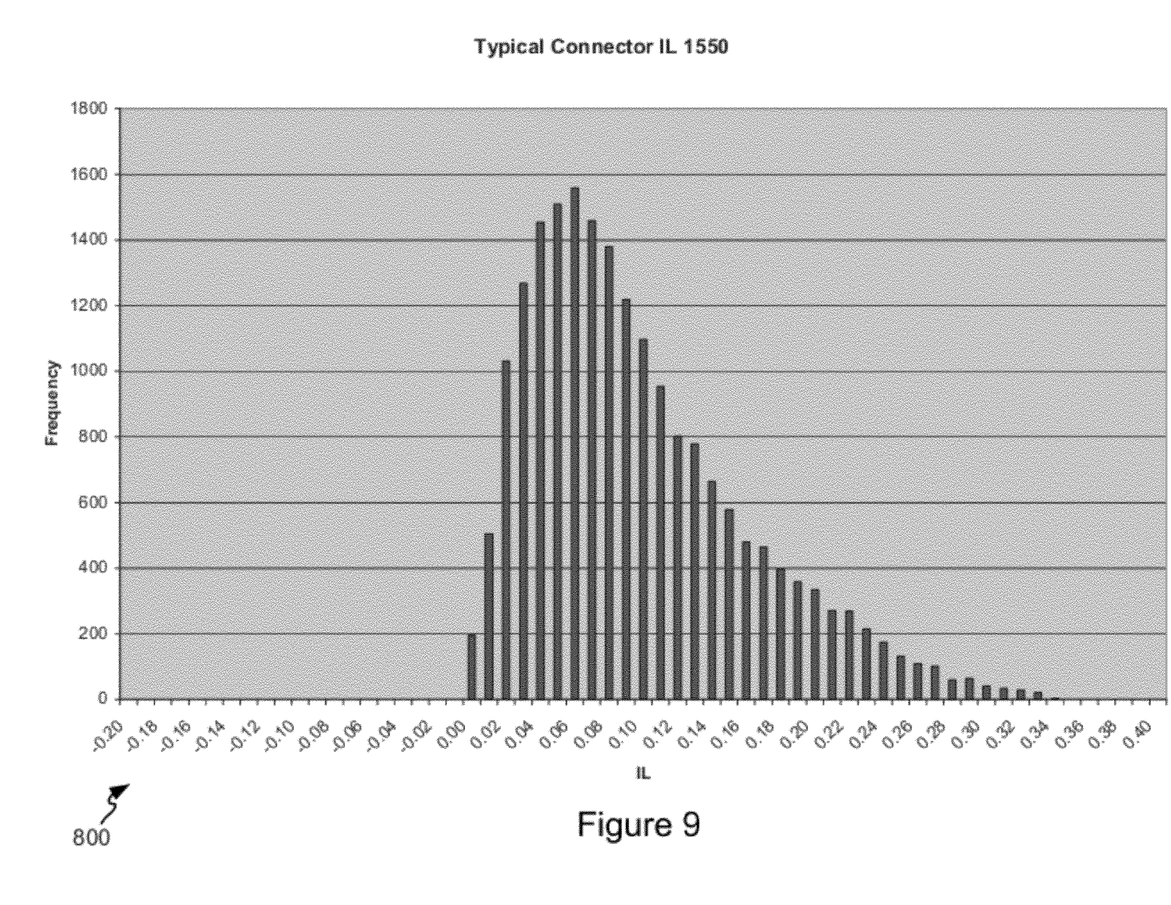
FIG. 9 is a bar graph illustrating a frequency at which certain levels of insertion loss are observed in optical connectors.

Referring now to FIGS. 9-12, various graphs are shown illustrating example test data demonstrating a manner in which the above methods for determining optical connection quality can be applied to particular data. For this analysis of insertion loss and mode field effects, it is assumed that a threshold for insertion loss at a connector is 0.2 dB, and that 9.1 um (@1310 nm) mode field diameter fiber is employed. FIG. 9 is a bar graph 800 illustrating a frequency at which certain levels of insertion loss are observed in optical connectors. The insertion losses illustrated in the graph 800 were determined using traditional bidirectional testing, to determine actual insertion loss characteristics absent any mode field effects. In the embodiment shown, it is recognized that, for the vast majority of connectors, the insertion loss of that connector remains between 0 and 0.2 dB, with only a small frequency of connectors in which a loss of greater than 0.2 dB is observed.

Figure 10:
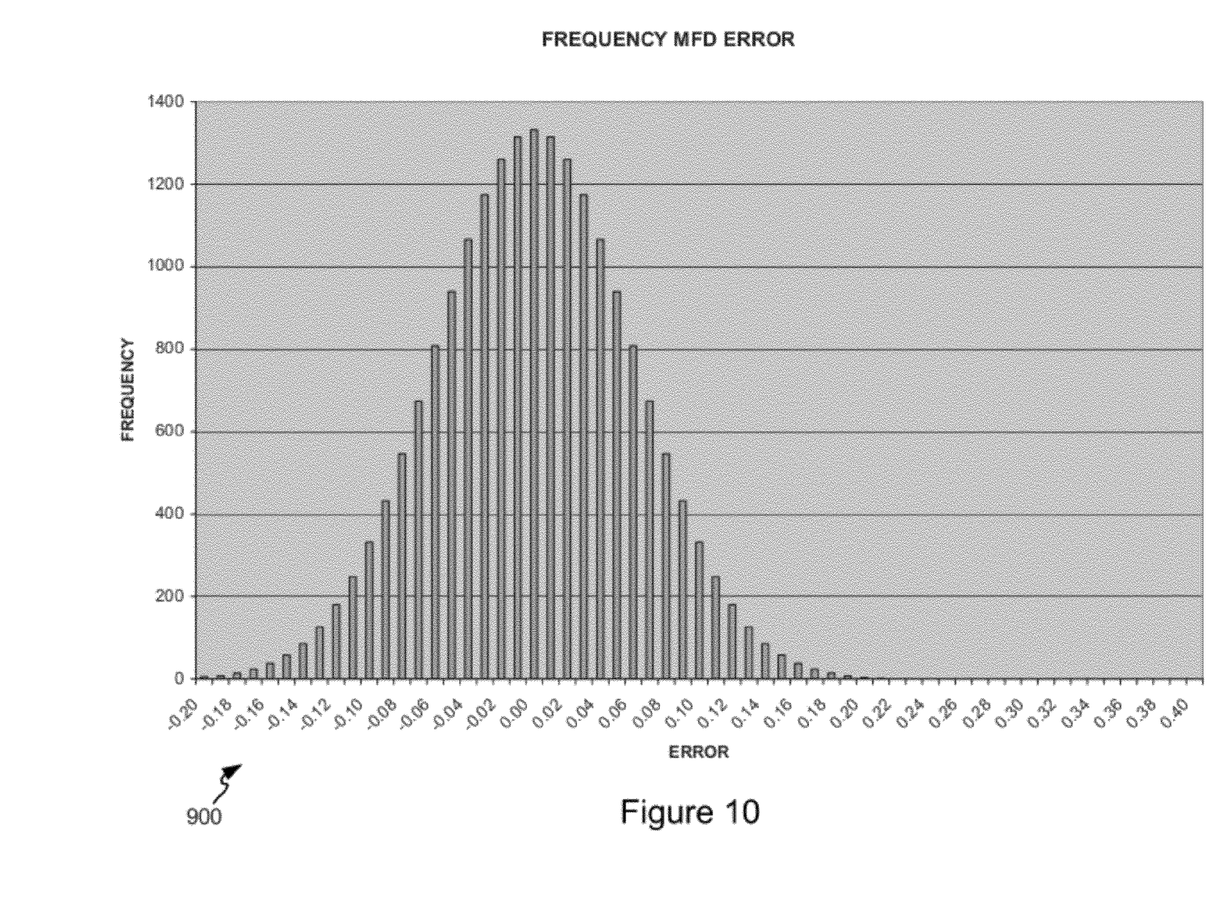
FIG. 10 is a bar graph illustrating a frequency in which errors occur due to mode field differences between an optical time domain reflectometer and an optical connection under test.

Turning to FIG. 10, a bar graph 900 illustrating a frequency in which errors occur due to mode field differences between an optical time domain reflectometer and an optical connection under test. The graph 900 also could be obtained using bidirectional testing, to determine an accurate representation of the effect of mode field differences. As shown in that graph 900, the vast majority of errors in insertion loss are between −0.2 dB and 0.2 dB. As such, the errors due to mode field diameter can confidently be predicted to fall between those values.

Based on the observations illustrated in FIGS. 9 and 10, any errors observed in a connector, where the connector falls outside of −0.2 dB to +0.2 dB will likely include insertion loss attributable to connector quality. Additionally, if 0.2 dB insertion loss is the determined threshold for a faulty connector, any connectors illustrating 0 dB and lower losses can be determined to fall below a "safe" insertion loss threshold, because (1) negative levels of insertion loss do not occur (see FIG. 9), and (2) mode field diameter effects will not cause a positive offset of greater than 0.2 dB, so it can be inferred that the connector cannot have a loss greater than that amount.

Figure 11:
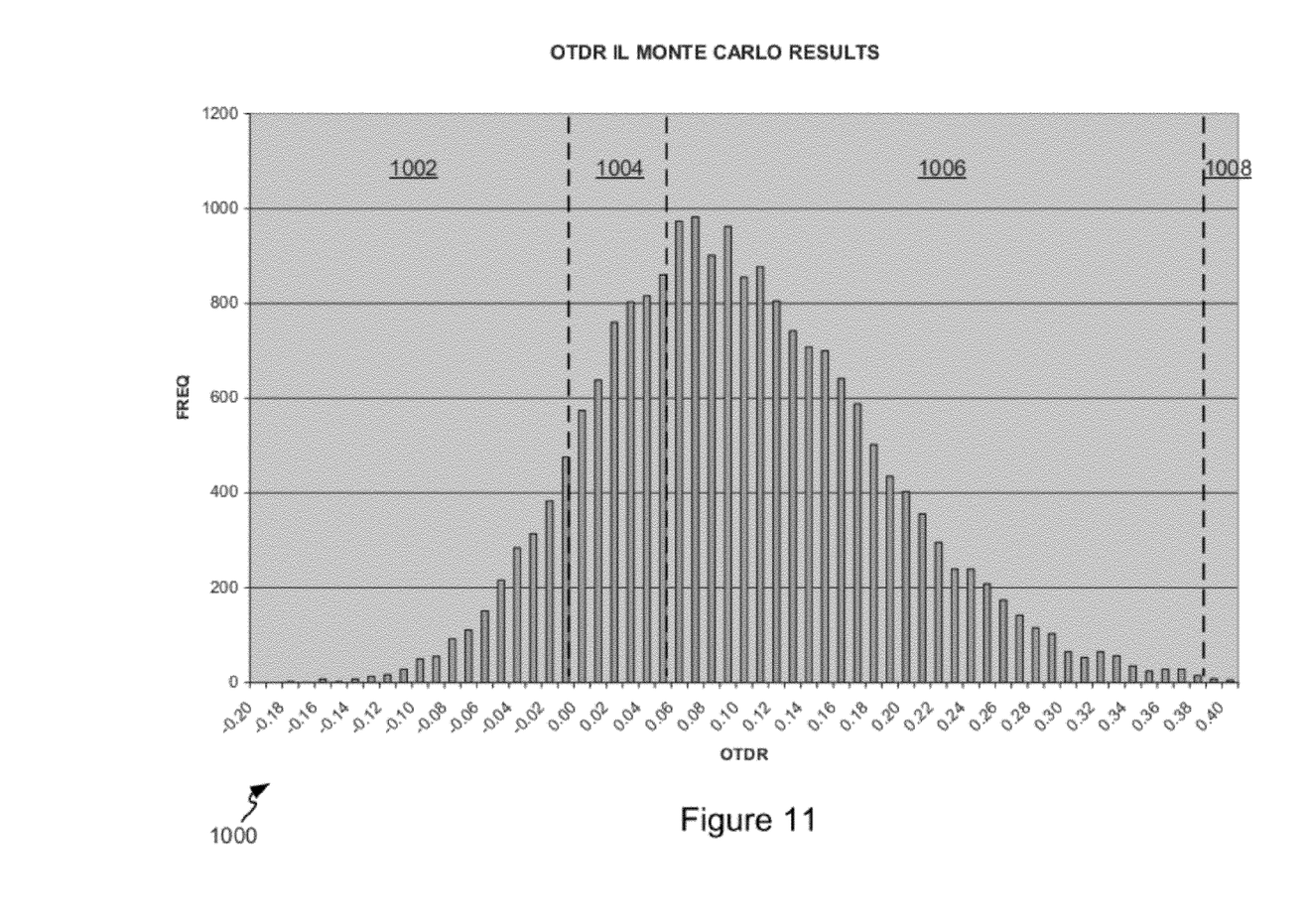
FIG. 11 is a bar graph illustrating a set of example test results for optical connectors using optical time domain reflectometry.

Turning now to FIG. 11, a bar graph 1000 illustrating a set of observed insertion losses is illustrated, using unidirectional OTDR analysis, as described in connection with FIG. 7, above. The bar graph 1000, in the embodiment shown, illustrates actual insertion losses observed. A series of vertical dotted lines separates various portions of the graph, for which certain observations are possible.

First, in the leftmost portion of the graph (labeled region 1002), insertion losses below 0 dB can be determined to be confidently good connectors, since a worst case of −0.2 dB attributable to these connectors would cause a 0 dB loss to be observed in the case of a 0.2 dB loss attributable to the connector, which would still be acceptable. For these connectors, no adjusted loss calculation is necessary.

Second, in the central portion of the graph (labeled region 1004) insertion losses between 0 dB and 0.06 dB, actual loss can be estimated, as described in the example provided above, using the equation: Estimated Loss=Mode Field Difference× 0.25+0.055 dB. By using a known mode field difference, a user can calculate that the mode field adjustment does or does not result in a loss reading less than a predetermined level (e.g., 0.2 dB) using a quick calculation to estimate the actual mode field loss while only using a unidirectional OTDR loss measurement.

Third, in a next portion of the graph (labeled region 1006) including observed insertion losses between 0.06 dB and 0.4 dB, actual loss can be estimated, as described in the example provided above, using the equation Estimated Loss=Mode Field Difference×0.658+0.0305. In this region, as with region 1004, mode field adjustments are used to determine whether losses exceed a predetermined level.

Fourth, in the far rightmost portion of the graph (labeled region 1008), insertion losses over 0.4 dB can be assumed to result from faulty optical connectors, since no mode field effect could be combined with a connector loss such that the connector loss would be less than 0.2 dB (since a maximum observed mode field loss in FIG. 10 was shown to be 0.2 dB).

Overall, it is seen that, if the OTDR insertion loss reading is 0.20 dB or less, then actual connector loss is 0.20 dB or less with 96.6% certainty. Furthermore, for those connectors having OTDR readings between 0 and 0.4 dB insertion loss that a calculated insertion loss can be used to obtain even greater confidence that the optical connector quality is sufficient.

In certain embodiments, additional rules can be determined based on observations of the overall measurements obtained using unidirectional OTDR loss readings. For example, for each of the OTDR readings that show loss less than 0.2 dB and having a mode field diameter greater than 9.1, those items can confidently be considered as not faulty, since these connections can only have mode field diameter effects that increase the observed loss.

FIG. 12 is a plotted diagram 1100 illustrating accuracy of estimation of error based on a reading from an optical time domain reflectometer. FIG. 12 represents a set of test results from which the slope (Multiplier) and constant values are derived for the above equation, Estimated Loss=Mode Field Difference×Multiplier+Constant dB. As illustrated, two linear equations are used as best-fit for the linear relationship between mode field diameter and loss, with a change in the equation used occurring at 0.6 dB.

Overall, the above processes result in a large amount of effort savings with respect to optical assembly testing, because the vast majority of optical assemblies will have well-matched mode fields and therefore the more time consuming and difficult (non-OTDR) testing type will be performed on those smaller number of fibers that are either among the rare group of mismatched mode fields or are among those that are in fact badly connectorized, i.e. have high insertion loss. These are a small number of the overall total of tested optical assemblies. Therefore, only a small number of optical assemblies must actually be tested using a bidirectional process, with the majority of optical assemblies able to be tested using the quick, unidirectional OTDR-based measurement systems described herein. Hence, where optical assemblies are not connectorized at opposite ends, substantial time is saved in connectorizing (and removing connectors from) the unconnectorized or "stub" ends to obtain testing approval.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of testing optical equipment, the method comprising:
   connecting an optical time domain reflectometer to optical equipment to be tested, the optical equipment including at least one optical connector;
   injecting an optical signal onto the optical equipment from the optical time domain reflectometer;
   observing an amount of reflected light at the optical connector;
   based on the observed reflected light, determining an amount of loss attributable to the optical connector, while accounting for a mode field diameter of an optical fiber at the optical connector;
   comparing the loss attributable to the optical connector to a predetermined amount of loss; and
   if the loss attributable to the optical equipment exceeds the predetermined amount of loss, determining the existence of a potentially faulty optical connector.

2. The method of claim 1, wherein the loss includes return loss and insertion loss attributable to the optical equipment.

3. The method of claim 1, wherein the optical equipment includes a first end, a second end, and an optical path interconnecting the first end and the second end.

4. The method of claim 3, wherein the optical equipment includes an optical connector at the first end.

5. The method of claim 3, wherein the optical equipment lacks a connector at the second end.

6. The method of claim 1, further comprising:
   determining a mode field diameter of one or more optical fibers in the optical equipment; and
   computationally adjusting the loss attributable to the optical equipment based on the mode field diameter.

7. The method of claim 6, further comprising:
   comparing the loss attributable to the optical equipment, as adjusted based on the mode field diameter, to a predetermined amount of loss; and
   if the adjusted loss attributable to the optical equipment exceeds the predetermined amount of loss, determining the existence of a faulty optical connection within the optical equipment.

8. A method of testing an optical connection of a fiber having first and second ends and a known mode field diameter, the fiber including an optical connector installed on one of the first and second ends, the method comprising:
   injecting an optical signal onto the optical fiber from an optical time domain reflectometer;
   observing an amount of reflected light at the optical connector;
   determining an amount of loss at a junction formed between the optical time domain reflectometer and the optical connector;
   computationally adjusting the loss attributable to the optical equipment based on the known mode field diameter of the fiber;
   comparing the loss attributable to the optical equipment, as adjusted based on the known mode field diameter, to a predetermined amount of loss; and
   if the adjusted loss attributable to the optical equipment exceeds the predetermined amount of loss, determining that the optical connection formed at the optical connector is faulty.

9. The method of claim 8, wherein adjusting the lost attributable to the optical equipment based on the known mode field diameter of the fiber includes subtracting an amount of loss from the loss determined at the junction based on a difference between the known mode field diameter of the fiber and a mode field diameter of an optical connector associated with the optical time domain reflectometer.

10. The method of claim 8, further comprising connecting an optical time domain reflectometer to the optical connector.

11. The method of claim 8, further comprising, performing further tests on the optical connector to validate the determination that the optical connector is faulty.

12. The method of claim 8, wherein the fiber lacks a connector at the second end.

13. The method of claim 8, wherein the fiber is connectorized at the first and second ends.

14. A method of testing connections for a plurality of optical devices, the method comprising:
   for each optical device, injecting an optical signal onto each connectorized optical fiber from an optical time domain reflectometer;
   for each injected optical signal, observing an amount of reflected light at an optical connector of the connectorized optical fiber;
   for each injected optical signal, determining an amount of loss at a junction formed between the optical time domain reflectometer and the optical connector;
   for each injected optical signal, comparing the loss attributable to the optical equipment to a predetermined amount of loss, the loss attributed to the optical equipment computationally adjusted based on a mode field diameter of an optical fiber at the optical connector; and
   if the adjusted loss attributable to the optical equipment exceeds the predetermined amount of loss, identifying the optical connector as potentially faulty.

15. The method of claim 14, further comprising, for each injected optical signal, adjusting the loss attributable to the optical equipment based on a known mode field diameter of the connectorized optical fiber.

16. The method of claim 15, wherein adjusting the loss attributable to the optical equipment based on the known mode field diameter of the connectorized optical fiber includes subtracting an amount of loss from the loss attributable to the optical equipment based on a difference between the known mode field diameter of the fiber and a mode field of an optical connector associated with the optical time domain reflectometer.

17. The method of claim 14, further comprising retesting each potentially faulty optical connector.

18. The method of claim 17, wherein retesting each potentially faulty optical connector includes determining the overall throughput loss for an optical signal through the optical device including the potentially faulty optical connector.

19. The method of claim 14, wherein the loss includes return loss and insertion loss attributable to the optical equipment.

20. An optical testing system comprising:
   an optical connector installed at an end of an optical cable;
   an optical time domain reflectometer connected to the optical connector, the optical time domain reflectometer configured to inject an optical signal onto the optical cable and observe an amount of reflected light at the connector; and
   a computing system communicatively connected to the optical time domain reflectometer, the computing system configured to determine an amount of loss attributable to the optical connector based on the amount of light reflected at the optical connector;
   wherein the computing system further computes the loss attributable to the optical connector to a predetermined amount of loss, accounting for a mode field diameter of an optical fiber at the optical connector, and, if the loss attributable to the optical equipment exceeds the predetermined amount of loss, determines the existence of a potentially faulty optical connector.

21. The system of claim 20, wherein the computing system is further configured to computationally adjust the loss attributable to the optical equipment based on the mode field diameter.

22. The system of claim 20, wherein the optical cable includes first and second ends, wherein the first end includes the optical connector and the second end is unconnectorized.

\* \* \* \* \*